United States Patent
Albertson et al.

(10) Patent No.: US 6,562,176 B2
(45) Date of Patent: May 13, 2003

(54) CONCENTRATED UV LIGHT CURING OF ADHESIVE FOR PIVOT APPLICATIONS

(75) Inventors: Eric Martin Albertson, San Jose, CA (US); Walter Lloyd Prater, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/910,991

(22) Filed: Jul. 23, 2001

(65) Prior Publication Data

US 2001/0040010 A1 Nov. 15, 2001

Related U.S. Application Data (63) Continuation-in-part of application No. 09/350,080, filed on Jul. 8, 1999, now Pat. No. 6,296,734.

(51) Int. Cl.⁷ .............................................. B32B 31/28
(52) U.S. Cl. .............................. 156/275.5; 156/275.7; 156/294; 156/379.6; 156/379.8; 360/99.08; 385/123
(58) Field of Search ........................... 156/273.3, 275.5, 156/275.7, 294, 379.8, 380.9, 379.6; 360/99.08; 606/16, 17; 385/123

(56) References Cited

U.S. PATENT DOCUMENTS

| | | | | |
|---|---|---|---|---|
| 3,690,775 A | * | 9/1972 | Cousins | 356/241.4 |
| 4,261,204 A | * | 4/1981 | Donaldson | 340/870.29 |
| 4,699,684 A | * | 10/1987 | Osborne | 156/379.6 |
| 5,115,761 A | * | 5/1992 | Hood | 118/641 |
| 5,267,995 A | * | 12/1993 | Doiron et al. | 385/123 |
| 5,316,610 A | | 5/1994 | Tamaki et al. | |
| 5,326,420 A | | 7/1994 | Vinouze et al. | |
| 5,684,908 A | * | 11/1997 | Kross et al. | 385/125 |
| 5,709,764 A | | 1/1998 | Funawatari et al. | |
| 5,738,753 A | | 4/1998 | Schwar et al. | |
| 5,770,002 A | | 6/1998 | Funawatari et al. | |
| 5,779,855 A | | 7/1998 | Amo et al. | |
| 5,821,646 A | | 10/1998 | Chuta et al. | |
| 5,968,039 A | * | 10/1999 | Deutsch et al. | 606/17 |

FOREIGN PATENT DOCUMENTS

| | | |
|---|---|---|
| JP | 60026075 A | 2/1985 |
| JP | 63186789 A | 2/1988 |
| JP | 01048879 A | 2/1989 |
| JP | 3108171 A | 5/1991 |
| JP | 405109819 A | 4/1993 |

OTHER PUBLICATIONS

*Hard Disk Motor Assembly Process with Ultra–iolet Adhesive in Nitrogen Atmosphere*, IBM Technical Disclocure Bulletin, Dec. 1992, vol. 35, No. 7.
*Hard Disk Spindle Motor Assembly Having a Spacer Ring Through Which Nitrogen Gas of UV Light can Pass*, IBM Technical Disclosure Bulletin, Feb. 1993, vol. 36, No. 2.

\* cited by examiner

*Primary Examiner*—Jeff H. Aftergut
*Assistant Examiner*—John L. Goff
(74) *Attorney, Agent, or Firm*—Robert B. Martin; Bracewell & Patterson, L.L.P.

(57) ABSTRACT

An adhesive curing apparatus and method utilizes the end of a tube or optical fiber extending from a UV light source. The tube end is inserted into the mounting hole in the side of a pivot assembly. The tube projects concentrated UV light into the interior of the assembly for curing the adhesive used to bond the bearings to the shaft and the housing. The tip at the end of the tube has beam splitting mirrors or prisms to distribute the UV light more effectively. The interior of the assembly, including the outer surface of the shaft and the inner surface of the housing are smooth, polished metal to further enhance the intensity of the light incident on the adhesive.

6 Claims, 6 Drawing Sheets

CONCENTRATED UV LIGHT CURING OF ADHESIVE FOR PIVOT APPLICATIONS

This patent application is a continuation-in-part of U.S. patent application Ser. No. 09/350,080, which was filed on Jul. 8, 1999, now U.S. Pat. No. 6,296,734 and is hereby incorporated by reference.

BACKGROUND OF THE INVENTION

1. Technical Field

This invention relates in general to curing photosetting adhesives and in particular to devices and methods for curing photosetting adhesives in a pivot cartridge assembly with concentrated UV light.

2. Description of the Related Art

Figure 1:
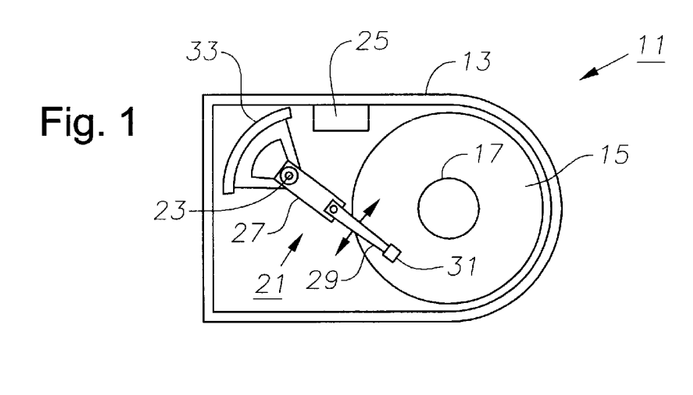
FIG. 1 is a top schematic view of a prior art hard disk drive.

Referring to FIG. 1, an information storage system comprising a hard disk drive 11 is shown. Drive 11 has a base 13 containing a plurality of stacked, parallel magnetic disks 15 (one shown) which are closely spaced apart. Disks 15 are rotated by a motor located therebelow about a central drive hub 17. An actuator 21 is rotatably mounted to base 13 about a pivot assembly 23. A controller 25 is mounted to base 13 for selectively moving actuator 21 as will be described below.

Actuator 21 has a mounting support 27, a pair of parallel, cantilevered load beams or suspensions 29 extending from mounting support 27, and a head gimbal assembly 31 having at least one magnetic read/write head secured to each suspension 29 for magnetically reading data from or magnetically writing data to disks 15. Suspensions 29 have a spring-like quality which biases or maintains them in parallel relationship relative to one another. A motor assembly 33 having a conventional voice coil motor is also mounted to pivot assembly 23 opposite head gimbal assemblies 31. Movement of actuator 21 (indicated by arrows) moves head gimbal assemblies 31 radially across tracks on the disks 15 until the heads on assemblies 31 settle on the target tracks.

During operation (FIG. 2), bearings 35 inside pivot assembly 23 emit oil vapor and aerosol droplets of grease which are a potential source of contamination in the disk drive. Reducing this type of contamination is important to improve the reliability of disk drives. In pivot assembly 23, a photosetting, anaerobic adhesive 37 is used to bond and seal the rings of the bearings 35 to a stationary housing 39 and an internal pivot shaft 45. Some adhesive 37 is located in the very small, circumferential gaps 46, 48 (approximately one to ten microns each) which extend between each bearing 35, and shaft 45 and housing 39, respectively. A hole 40 extends through the side of housing 39 into its interior and is used for mounting purposes.

Figure 2:
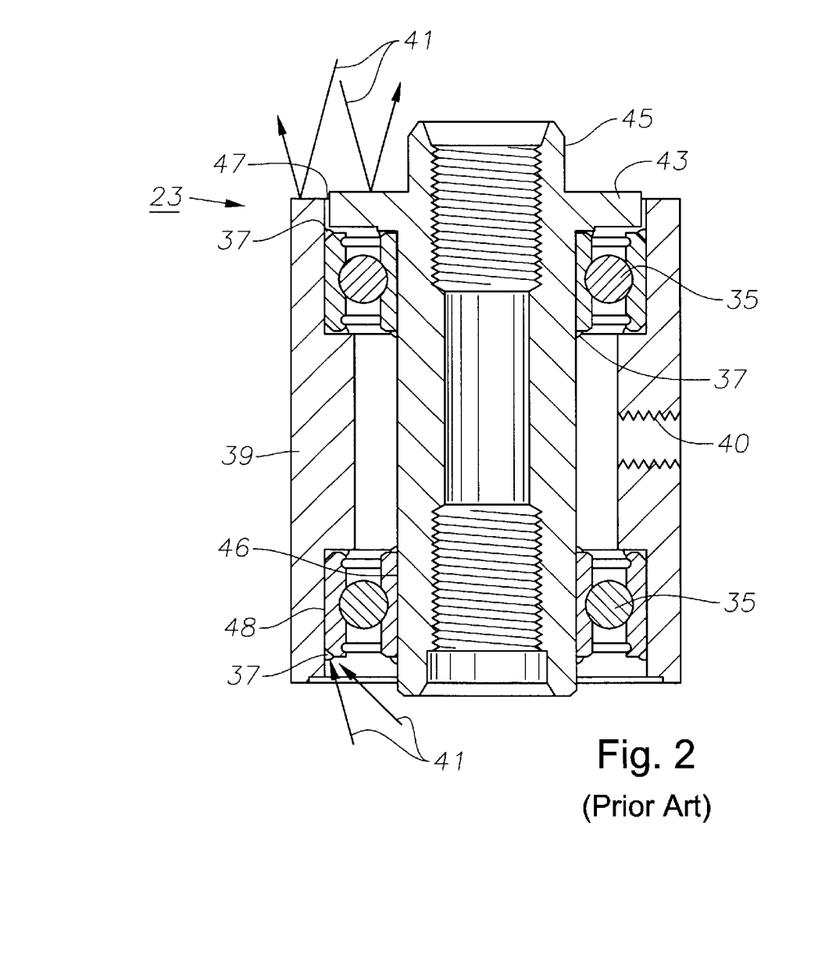
FIG. 2 is a sectional side view of a pivot assembly in the disk drive of FIG. 1.

Typically, the adhesive 37 is cured by passing the assembled pivots 23 under a UV light 41. However, due to geometrical constraints, such as the opaque flange 43 on the pivot shaft 45, access to adhesive 37 is severely limited. In addition, the small size of gaps 46, 48 makes access to them severely limited. Most of the emitted light 41 reflects off the pivot and oven surfaces with few UV rays penetrating gaps 46, 48 and the narrow slit or space 47 (approximately 0.1 mm in width) between the perimeter of flange 43 and the inner diameter of housing 39. This results in joints with uncured adhesive and lower bond strengths. When the pivot 23 is later subjected to file operating temperatures, the uncured adhesive will outgas from parts and may also propagate cracks in the bond, which can lead to pivot failure.

To solve this problem, pivot manufacturers have increased the time the pivots are exposed to the UV light to ensure that the adhesive has sufficiently cured. Unfortunately, this solution requires more power and longer process times which result in increased manufacturing costs and process inefficiencies.

Therefore, it is a feature of the present invention to provide improved methods for directing UV light to the less accessible portions of pivots to provide a completely cured bond.

It is another feature of the present invention to provide decreased manufacturing costs and cycle times for processing pivots.

SUMMARY OF THE INVENTION

One embodiment of an adhesive curing apparatus and method utilizes the end of a tube or optical fiber extending from a UV light source. The tube end is inserted into the mounting hole in the side of a pivot assembly. The tube projects concentrated UV light into the interior of the assembly for curing the adhesive used to bond the bearings to the shaft and the housing. The tip at the end of the tube has beam splitting mirrors or prisms to distribute the UV light more effectively. The interior of the assembly, including the outer surface of the shaft and the inner surface of the housing are smooth, polished metal to further enhance the intensity of the light incident on the adhesive.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 3:
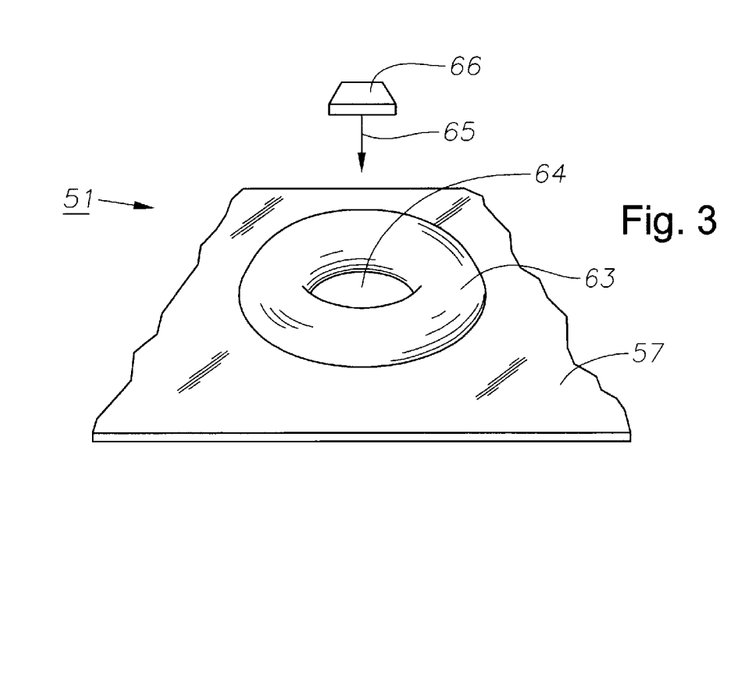
FIG. 3 is a top isometric view of a first embodiment of a device for curing adhesive in the pivot assembly of FIG. 2.
Figure 4:
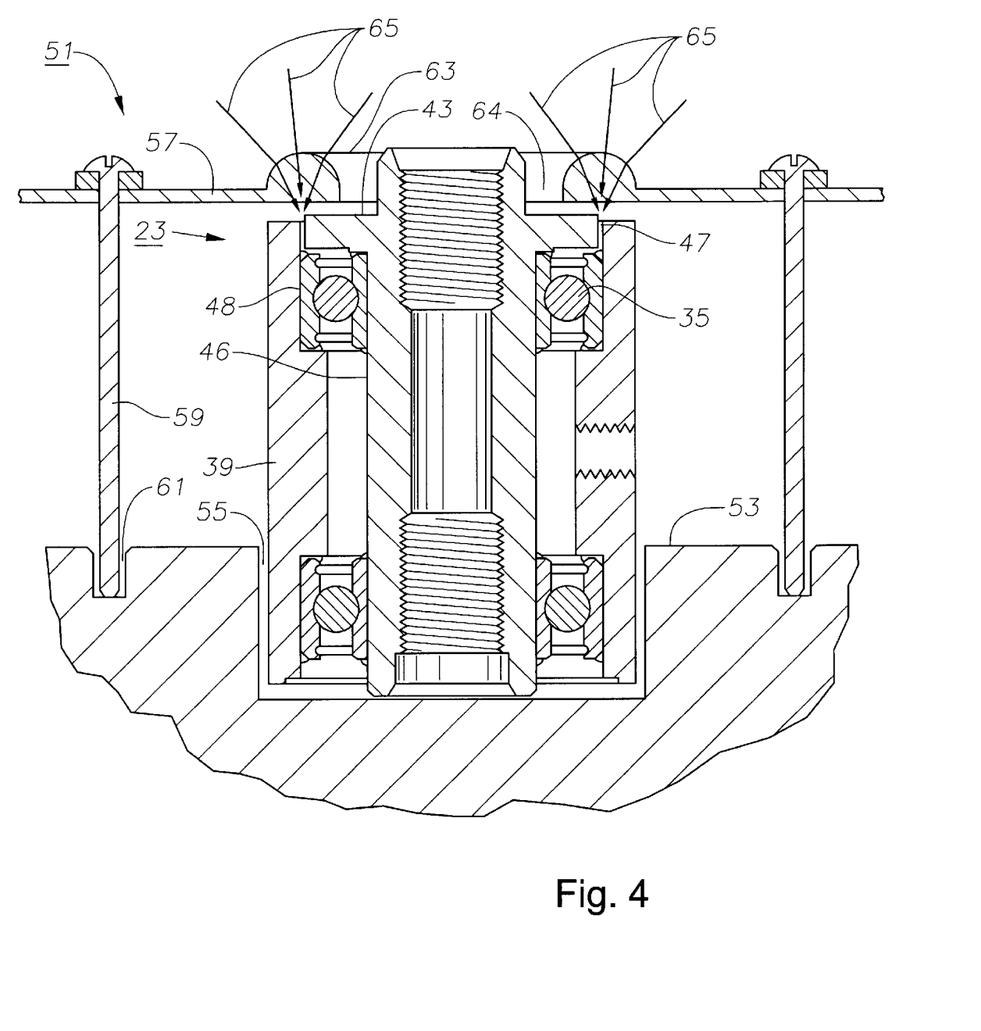
FIG. 4 is a sectional side view of the pivot assembly of FIG. 2 mounted in the device of FIG. 3.

Referring to FIGS. 3 and 4, a first embodiment of a device 51 for facilitating the curing of photosetting substances is shown. Device 51 comprises a base 53 with a plurality of recesses 55 (one shown) for closely receiving the lower ends of pivot assemblies 23. Device 51 has a plate 57 with a plurality of alignment pins 59 mounted thereto which extend downward from the lower surface of plate 57. The length of pins 59 is selected to position plate 57 at a precise distance above the upper end of assemblies 23, and corresponds to the focal length of lens 63. The lower end of each pin 59 is received in a socket 61 in the upper surface of base 53. Pins 59 and sockets 61 may engage one another through smooth sliding contact, threads, or other joining means.

Plate 57 has a plurality of semi-toroidal lenses 63 (one shown for simplicity). Lenses 63 may be integrally formed with plate 57 or affixed thereto. Each lens 63 is a glass, plastic, or otherwise UV-transparent material for concentrating UV light 65 from a light source 66. The light 65 incident on its convex surface is directed vertically downward to specific locations on one assembly 23 located immediately therebelow. In the embodiment shown, lenses 63 have a central opening 64 for accommodating the upper end of assembly 23. As shown in FIG. 4, lens 63 focuses light 65 into the narrow space 47 between flange 43 and housing 39. Space 47 is only about 0.1 mm wide, but the intense burst of light 65 quickly cures the adhesive 37 located inside assembly 23. When assembly 23 is configured with the flange geometry 43 shown, the primary target for lens 63 is the adhesive 37 at or near gap 48 between the upper bearing 35 and housing 39. However, some secondary curing will also occur at or near gap 46. With a different flange geometry (e.g. relocating space 47 radially inward, closer to gap 46), it should be apparent that the curing of adhesive 37 at gap 46 would be even more thorough.

Figure 5:
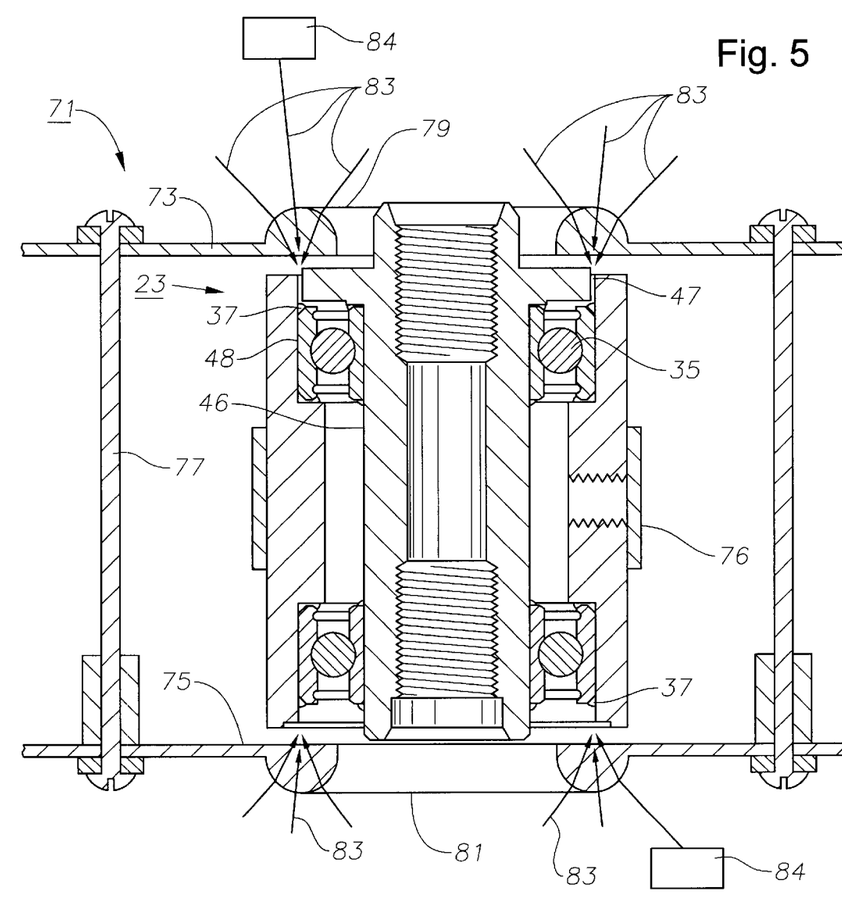
FIG. 5 is a sectional side view of the pivot assembly of FIG. 2 mounted in a second embodiment of the device of FIGS. 3 and 4.

Referring now to FIG. 5, a second embodiment of the invention is shown as device 71. Device 71 is very similar to device 51, except that it is designed to cure adhesive 37 on both ends of assembly 23. Device 71 has an upper plate 73, a parallel lower plate 75, and a fixture 76 (shown schematically) for supporting assemblies 23 therebetween. Plates 73, 75 are joined together with a plurality of alignment pins 77.

Each plate 73, 75 has a plurality of semi-toroidal, UV-transparent lenses 79, 81, respectively (one shown on each plate). Lenses 79, 81 are organized in vertically aligned pairs for concentrating UV light 83 from a light source 84. The light 83 incident on the convex surfaces of lenses 79, 81 is directed toward one assembly 23 that is selectively positioned on a fixture (not shown) between them. Lenses 79, 81 have a central opening for accommodating the upper and lower ends of assembly 23. Lenses 79, 81 focus light 83 into the narrow space 47 and the open lower end of assembly 23, to quickly cure the adhesive 37 located in or near gaps 46, 48 between bearings 35 and assembly 23 at both ends simultaneously.

Figure 6:
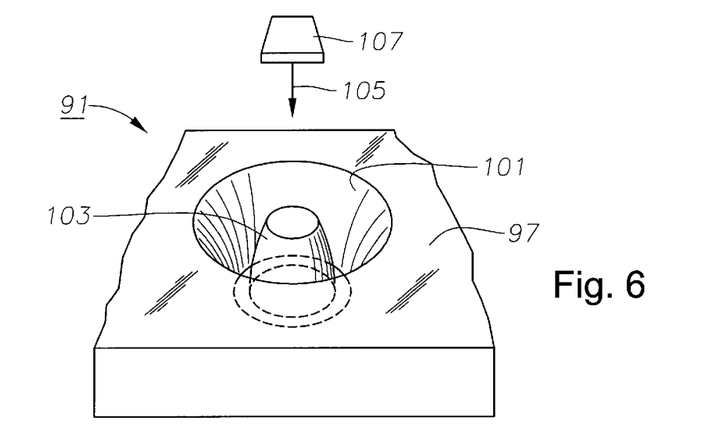
FIG. 6 is a top isometric view of a third embodiment of the device of FIG. 3.
Figure 7:
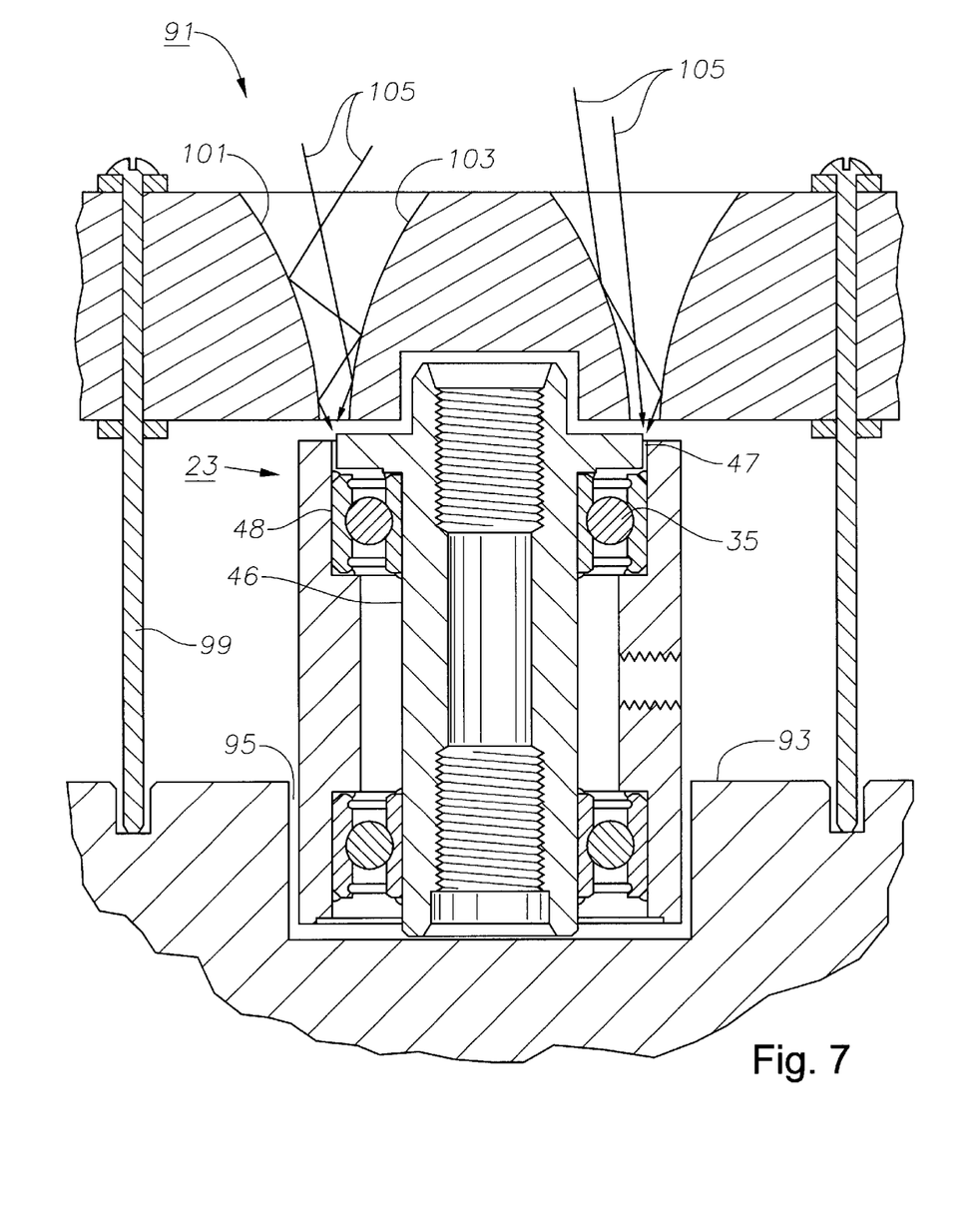
FIG. 7 is a sectional side view of the pivot assembly of FIG. 2 mounted in the device of FIG. 6.

A third embodiment of the invention is shown as device 91 in FIGS. 6 and 7. Device 91 is most similar to device 51 and comprises a base 93 with a plurality of recesses 95 (one shown) for closely receiving the lower ends of pivot assemblies 23. Device 91 has a thick plate 97 with a plurality of alignment pins 99 which extend downward to base 93.

Plate 97 also has a plurality of generally parabolic openings 101 (one shown) with a central convex hub 103. The surfaces of openings 101 and hub 103 are mirrored or highly reflective for gathering and focusing UV light 105 from a light source 107. Light 105 is redirected from many different angles downward into the narrow space 47 in assembly 23. The focused light 105 quickly cures the adhesive 37 located in gaps 46, 48 between the upper bearing 35 and assembly 23. When assembly 23 is configured with the flange geometry 43 shown, the primary target for opening 101 is gap 48. However, some secondary curing will also occur at or near gap 46. With a different flange geometry, it should be apparent that the curing of adhesive 37 at gap 46 would be even more thorough. Note that each of the lenses 79, 81 in the embodiment of FIG. 5 can be readily replaced with an opening 101, as shown and described for device 91, to cure adhesive 37 on both ends of assembly 23 simultaneously.

Figure 8:
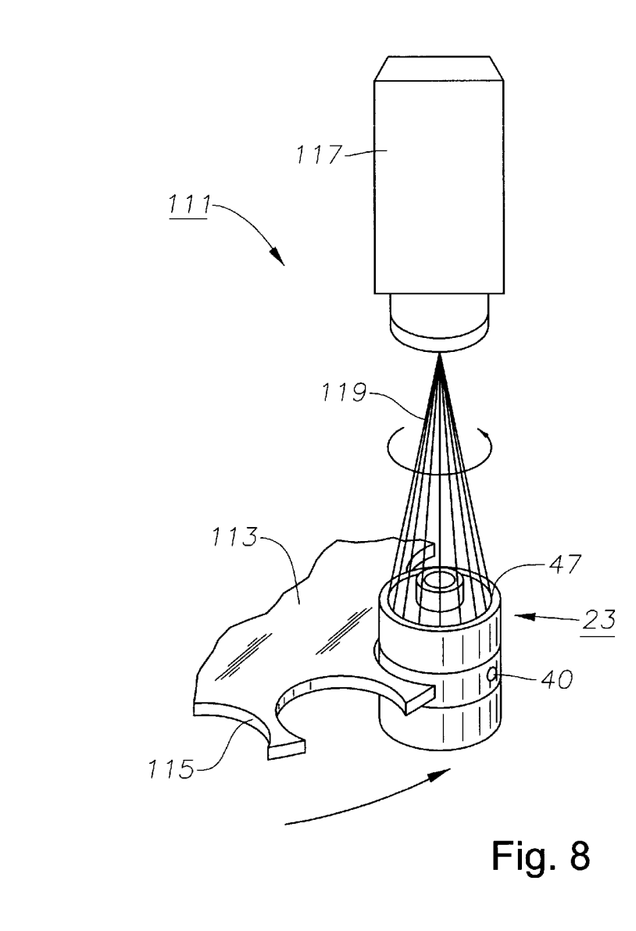
FIG. 8 is an isometric view of a fourth embodiment of the device of FIG. 3.

Referring now to FIG. 8, a fourth embodiment of the invention is shown as device 111, Device 111 comprises a movable base or fixture 113 with a plurality of positions 115 which each support a pivot assembly 23. In the embodiment shown, fixture 113 is a plate and positions 115 are recesses that releasably grip the exterior of assemblies 23.

A UV light source 117 is spaced apart from fixture 113 and projects concentrated UV light 119 into spaces 47 and gaps 46, 48 in assemblies 23. Preferably, rotating mirrors, prisms, or laser beam splitters are used to focus UV laser light in a circular pattern as shown. Fixture 113 is then pivoted, rotated or incremented in the direction shown with a motor to align the next assembly 23 for UV exposure by light source 117. The focused light 119 quickly cures the adhesive 37 located beneath spaces 47 and in gaps 46, 48. Note that a second light source 117 could be readily mounted on the opposite side of fixture 113 in order to cure the adhesive 37 on the lower ends of assemblies 23.

Figure 9:
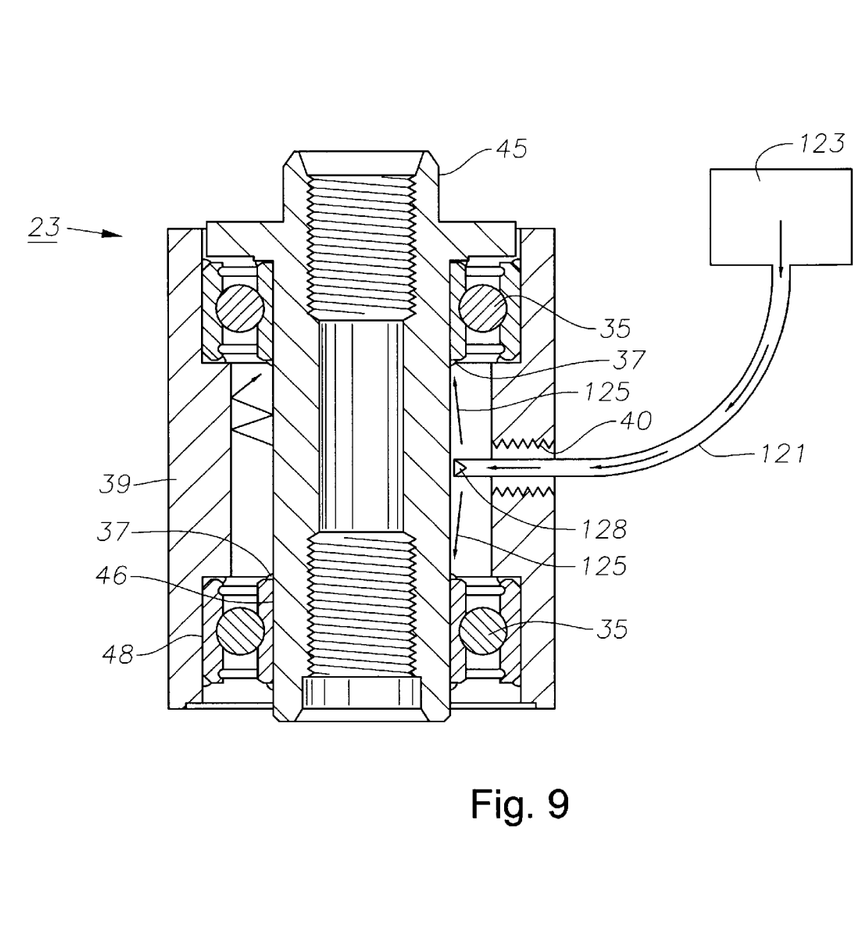
FIG. 9 is a sectional view of the pivot assembly of FIG. 2 utilizing a fifth apparatus and method for curing adhesive.

A fifth embodiment of the present invention is shown in FIG. 9 and can be used to cure adhesive in many types of assemblies, including pivot assemblies and disk drive motors. In this version, one end of a optical fiber or tube 121 extending from a UV light source 123 is inserted into the mounting hole 40 in the side of a pivot assembly 23. In addition, there can be more than one opening in assembly 23 to accept multiple tubes or fibers (only one of each is shown for simplicity). Tube 121 projects concentrated UV light 125 into the interior of assembly 23 for curing the adhesive 37 used to bond bearings 35 to a shaft 45 and housing 39. One of the shaft 45 and the housing 39 is rotatable relative to the other. A small beam splitter 128, such as the prism-shaped mirror device shown in FIG. 9, is located at the distal tip of tube 121 to distribute the TV light more effectively. Beam splitter 128 reflects the original beam into two beams 125 that are essentially orthogonal to the original beam. Beams 125 are directed toward the bearing-shaft interface where they are needed, instead of allowing the UV light to randomly reflect around inside assembly 23. However, the interior of assembly 23, including the outer surface of shaft 45 and the inner surface of housing 39 are smooth, polished metal to further enhance the intensity of the light 125 incident on the adhesive 37. Since this version is primarily suited for curing adhesive 37 located in the interior of assembly 23 between bearings 35, it is designed to be used in conjunction with any of the preceding versions of the invention which are primarily for curing the adhesive 37 in or near gaps 46, 48.

Figure 10:
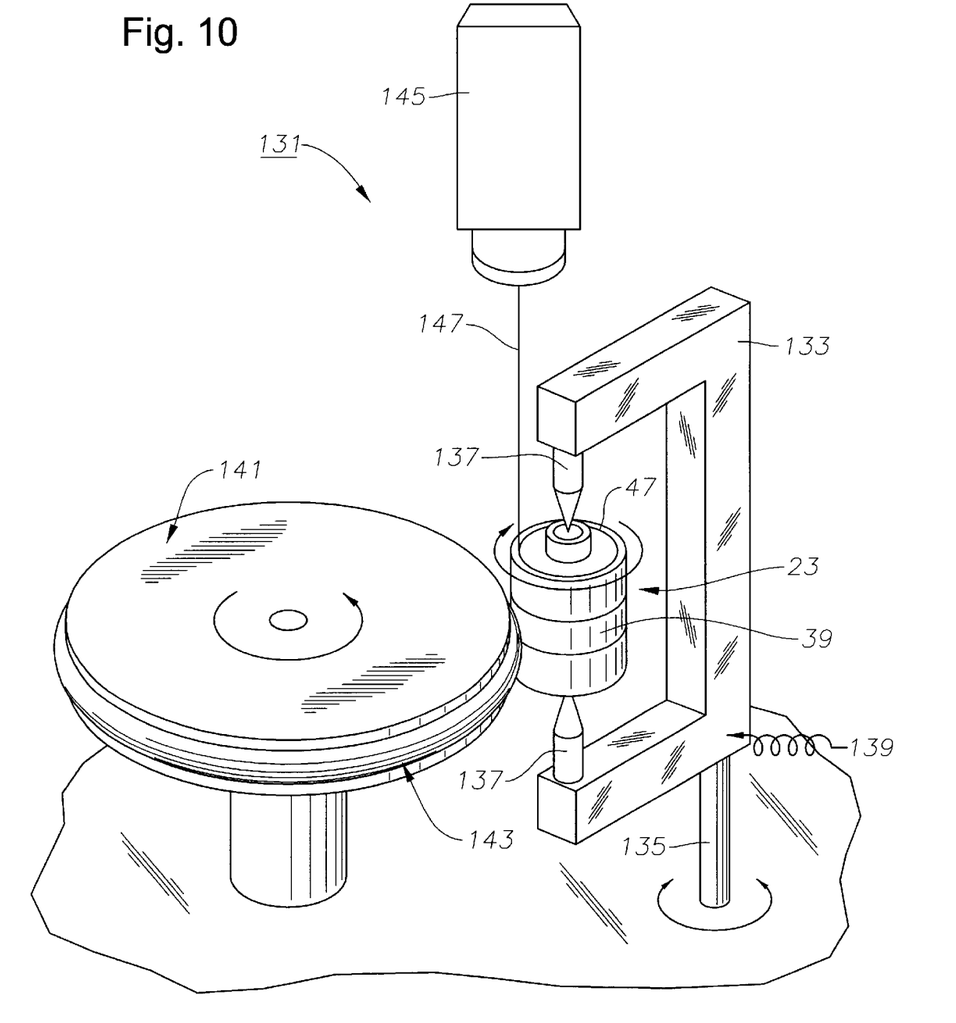
FIG. 10 is a schematic, isometric view of a sixth embodiment of the device of FIG. 3.

Referring now to FIG. 10, a sixth embodiment of the invention is shown as device 131. Device 131 is similar to device 111 and comprises a fixture 133 which is pivotable about an axle 135 and has a pair of support pins 137 for engaging the upper and lower ends of a pivot assembly 23. A bias member 139, such as a spring, is used to urge fixture 133 and its assembly 23 into engagement with a rotary mechanism 141 which rotates in the direction shown. In the embodiment shown, mechanism 141 is a drive wheel located adjacent to fixture 133 and has a rubber belt 143 extending around its circumference for engaging the housing 39 of assembly 23.

A UV light source 145 is axially spaced apart from fixture 133 and assembly 23. Light source 145 projects a concentrated UV light 147, such as a single laser beam, into space 47 in assembly 23 as shown. Although fixture 133 is stationary during this operation, mechanism 141 rotates assembly 23 in the direction shown. The entire circumferential length of space 47, and, thus, adhesive 37 in gaps 46, 48, is exposed to light 147 which cures adhesive 37. Note that a second light source 145 could be readily mounted on the opposite side of fixture 133 in order to cure the adhesive 37 on the lower end of assembly 23.

The invention has significant advantages. The various devices and methods described for curing obstructed photosetting compounds can reduce curing cycle times by over 50% and decrease production costs. Even hard to reach areas of an assembly can be readily accessed with the invention. The narrow slit between the opaque members of the assemblies permit just enough UV light to enter to cure the photosetting adhesive. Since the light is concentrated, the adhesive can also be cured with a single "shot" of light rather than being exposed to UV light in an oven for a duration of time.

While the invention has been shown or described in only some of its forms, it should be apparent to those skilled in the art that it is not so limited, but is susceptible to various changes without departing from the scope of the invention. In addition, each of these design is also applicable to disk drive spindle motors.

What is claimed is:

1. A device for curing a photosetting substance in an assembly, such as a pivot assembly or a disk drive motor, having a housing with an interior and an opening to the interior, a shaft having an axis mounted inside the interior of the housing such tat one of the shaft and the housing is rotatable relative to the other, wherein the photosetting substance is located at interfaces between the housing and the shaft at opposite axial ends of the assembly, comprising:

a UV light source for emitting UV light;

a conduit having proximal and distal ends for concentrating light from the light source at the proximal end and directing the light to the distal end and into the opening in the housing to cure the photosetting substance located inside the assembly; and a beam splitter mounted to the distal end in the conduit for distributing the light inside the housing, wherein the beam splitter is a prism-shaped mirror that divides an original beam of the light into multiple beams that are essentially orthogonal to the original beam and move in substantially opposite directions.

2. A device for curing a photosetting substance, comprising in combination:

an assembly having an axis, axial ends, a housing with an interior, an opening in the housing extending to the interior and located between the axial ends, a shaft mounted inside the interior of the housing such that one of the shaft and the housing is rotatable about the axis relative to the other, and a photosetting substance located at interfaces between the housing and the shaft on the axial ends of the assembly;

a UV light source for emitting light;

a conduit having proximal and distal ends for concentrating light from the light source at the proximal end and directing the light into the opening in the housing at the distal end to cure the photosetting substance located inside the assembly; and a beam splitter mounted to the distal end of the conduit for distributing the light inside the housing, the beam splitter comprising a prism-shaped mirror that reflects an original beam of the light into multiple beams in substantially opposite directions that are essentially orthogonal to the original beam to cure the photosetting substance on the axial ends of the assembly.

3. The device of claim 2 wherein the opening is a mounting hole in a side of the housing.

4. The device of claim 2, further comprising a plurality of openings in the housing for accepting a plurality of conduits, each of which directs light from the light source into the assembly.

5. The device of claim 2 wherein the interior of the housing and an outer surface of the shaft are smooth polished metal to further enhance the intensity of the light incident on the photosetting substance.

6. A method for curing a photosetting substance located within an assembly, such as a pivot assembly or a disk drive motor, the method comprising:

providing an assembly having a first component with an interior, an axis, an axial ends, a second component mounted coaxially inside the interior of the first component, and an opening in the first component located between the axial ends;

locating a photosetting substance within the assembly at the axial ends at interfaces between the first and second components;

inserting a conduit into the opening between the axial ends, the conduit having approximal end and a distal end with a beam splitter mounted to the distal end;

concentrating and directing an original beam of light through the conduit from the proximal end to the distal end and through the opening;

reflecting the light with the beam splitter at the distal end such that the original beam is divided into multiple beams in substantially opposite directions that are essentially orthogonal so the original beam to cure the photosetting substance at the axial ends; and then removing the conduit from the assembly.

* * * * *

UNITED STATES PATENT AND TRADEMARK OFFICE
CERTIFICATE OF CORRECTION

PATENT NO. : 6,562,176 B2
DATED : May 13, 2003
INVENTOR(S) : Albertson et al.

It is certified that error appears in the above-identified patent and that said Letters Patent is hereby corrected as shown below:

Column 5,
Line 34, please delete the word "tat" and replace it with -- that --.

Column 6,
Line 41, please delete the word "approximal" and replace it with -- a proximal --.

Signed and Sealed this

Eighth Day of February, 2005

JON W. DUDAS
*Director of the United States Patent and Trademark Office*